INVENTOR.
John E. Lastovica, Jr.

ATTORNEY 3,142,688
METHOD FOR PURIFYING DIGLYCIDYL ETHER OF BISPHENOL A
John E. Lastovica, Jr., Lake Jackson, Tex., assignor to The Dow Chemical Company, Midland, Mich., a corporation of Delaware
Filed May 23, 1962, Ser. No. 197,160
9 Claims. (Cl. 260—348)

The present invention relates to a new and useful method for purifying diglycidyl ether of Bisphenol A. The present invention is more particularly concerned with a method of crystallizing impure or crude diglycidyl ether of Bisphenol A to provide a pure crystalline, white, free-flowing product having a sharp melting point.

It has now been found that the crystallization of the diglycidyl ether of Bisphenol A from a two-component miscible solvent system will produce the ether in a pure crystalline form from a single crystallization.

It is an advantage of the present invention that the procedure conveniently takes place at or below room temperature, thus decomposition or polymerization cannot take place.

Figure 1:
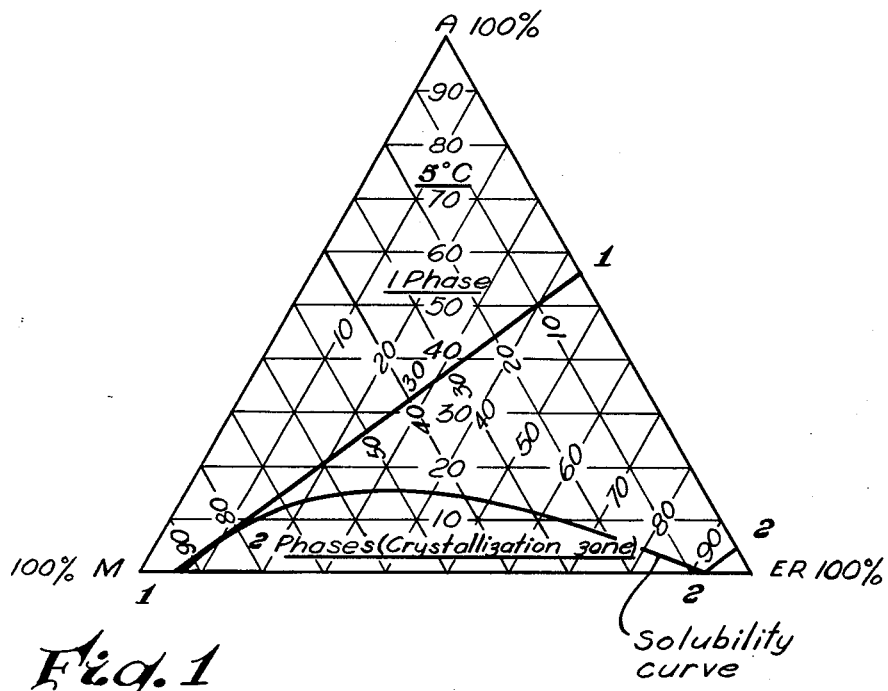
Figure 2:
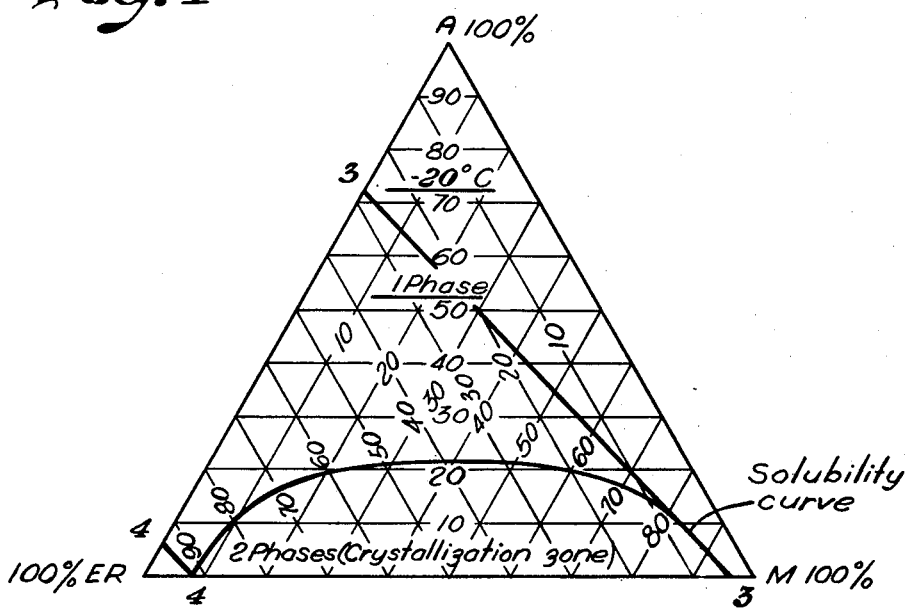

FIGURES 1 and 2 are solubility curves for the system Epoxy Resin (ER), Acetone (A) and Methanol (M) and were derived in accordance with standard procedures at the temperatures indicated.

The lines 1—1, 2—2, 3—3, and 4—4 represent the maximum solvent composition which can be diluted to bring the ultimate composition under the area of the 2-phase curve. It is to be understood that if the crystallization temperature is other than 5° C. or —20° C. the lines similar to 1—1, 2—2, 3—3, and 4—4 will vary between 1—1, 2—2, 3—3, and 4—4 if the temperature is between 5° C. and —20° C. and that such diagrams as FIGURES 1 and 2 can be constructed for any temperature.

In one manner of carrying out the process of the present invention, a crude diglycidyl ether of Bisphenol A is dissolved in a first inert organic solvent in which the ether is highly soluble at the temperature of solution, i.e., above about 5° C., such as a lower alkanol or a lower aliphatic ketone or a mixture thereof, cooling the resulting solution to between about 5° and about —25° C., redissolving with ketone solvent as necessary any liquid resin which may form and then diluting the solution with a second organic solvent in which the ether is less soluble at the temperature of crystallization. Suitable solvents which have been found operative in the first step of the invention are the lower aliphatic ketones, such as acetone, methyl ethyl ketone, and the like, and the lower alkanols such as methanol, ethanol, and the like.

Suitable solvents for the solution of liquid resin which forms on cooling the first solvent mixture are the lower ketones such as acetone, methyl ethyl ketone and the like.

Solvents which have proven most effective for dilution of the first solvent are methanol and ethanol.

Crude diglycidyl ether of Bisphenol A which has an epoxy content of at least 23% can be purified by the technique of the present invention.

Alternatively, having determined the amounts of solvents necessary by the foregoing manner, the total amount of mixed solvent, i.e., that necessary to dissolve and precipitate, can be employed to dissolve the crude epoxy resin at or above about 5° C., then the mixture cooled to below 5° C. to crystallize out the pure epoxy resin. This procedure is commercially preferable since only one step is necessary.

The following examples are illustrative of the present invention but are not to be construed as limiting.

*Example 1*

53.8 grams of crude diglycidyl ether of Bisphenol A (containing 24.5%, by weight, of epoxide and 0.4%, by weight, of chlorine) was dissolved in 200 ml. of methyl alcohol and the resulting solution cooled to —20° C. Acetone cooled to —20° C. was added slowly to dissolve the liquid resin which came out of solution. Seventy-seven (77) ml. of acetone were required. Thereafter 200 ml. of methanol cooled to —20° C. was added rapidly (in about 1 minute). Almost immediately small crystals formed. Upon standing for a short period of time, the formation of crystals from solution substantially ceased and the resulting suspension was filtered. The crystalline cake was dried at 25° C. and 0.2 millimeters pressure to obtain a white, free-flowing, crystalline diglycidyl ether of Bisphenol A having an epoxide content of 25.2% by weight and a total chlorine content of 0.1% by weight. The crystalline product had a sharp melting point of 42° C. and formed on melting a clear colorless liquid.

*Example 2.—Solubility of Diglycidyl Ether of Bisphenol A in Methyl Alcohol-Acetone at 5° C.*

[Composition, weight percent of saturated solution]

| Methyl Alcohol | Acetone | Resin | Percent Acetone in Solvent |
|---|---|---|---|
| 93.2 | 0.0 | 6.8 | 0 |
| 79.1 | 8.7 | 12.2 | 10 |
| 68.4 | 13.0 | 18.6 | 16 |
| 62.5 | 14.4 | 23.1 | 19 |
| 55.5 | 14.9 | 29.6 | 21 |
| 49.2 | 14.5 | 36.3 | 23 |
| 39.2 | 13.2 | 47.6 | 25 |
| 8.3 | 0.0 | 91.7 | 0 |

*Example 3.—Solubility of Diglycidyl Ether of Bisphenol A in Methanol-Acetone at —20° C.*

[Composition, weight percent of saturated solution]

| Resin | Methanol | Acetone | Percent Acetone in Solvent |
|---|---|---|---|
| 4.2 | 95.8 | 0 | 0 |
| 7.2 | 83.1 | 9.7 | 10.5 |
| 9.6 | 75.7 | 14.7 | 16.2 |
| 9.8 | 73.9 | 16.3 | 18.1 |
| 15.6 | 65.8 | 18.6 | 22.1 |
| 21.0 | 58.2 | 20.8 | 26.3 |
| 29.4 | 48.9 | 21.7 | 30.7 |
| 32.2 | 46.5 | 21.3 | 31.4 |
| 31.4 | 48.1 | 20.6 | 30.0 |
| 4.98 | 91.8 | 3.3 | 3.2 |
| 73.7 | 11.8 | 14.5 | 55.1 |
| 92.0 | 8.0 | 0 | 0 |

*Example 4*

170 grams of crude diglycidyl ether of Bisphenol A (containing 24.6% by weight, of epoxide and 0.4% by weight, of chlorine) were added to a solution containing 35 ml. acetone and 22 ml. methanol. The resulting solution was cooled to —20° C. and added slowly to 84 ml. of methanol which had been pre-chilled to —20° C. The solution was stirred rapidly during the addition of the resin solution to the methanol. The crystals obtained were filtered immediately and dried under 0.2 millimeters of mercury pressure. The product obtained was a white, free-flowing, crystalline diglycidyl ether of Bisphenol A having an epoxide content of 25.2%, by weight, and a total chlorine content of 0.1%, by weight. The crystalline product had a sharp melting point of 42° C. and formed, on melting, a clear colorless liquid.

This application is a continuation-in-part application of my copending application Serial No. 759,552, filed September 8, 1958 now abandoned.

I claim:
1. The method for purifying crude diglycidyl ether of 4,4'-isopropylidenediphenol having an epoxy content of at least 23% which comprises:
   dissolving the ether in an inert organic solvent consisting of a mixture of a lower alkanol and a lower aliphatic ketone, the amount of solvent and said ketone and said alcohol being employed in a proportion to dissolve the ether at above about 5° C. but insufficient to dissolve the ether at below about 5° C.;
   cooling said resulting solution to between about 5° C. to −25° C.; and
   recovering said crystallized ether.
2. The method for purifying crude diglycidyl ether of 4,4'-isopropylidenediphenol having an epoxy content of at least 23% which comprises:
   dissolving the ether in a first inert organic solvent selected from the group consisting of lower aliphatic ketones, lower alcohols and mixtures thereof, said solvent being employed in an amount and said ketone and said alcohol being in a proportion to dissolve the ether at about room temperature but insufficient to dissolve the ether at about 5° C.;
   cooling said solvent solution to between about 5° and about −25° C.;
   redissolving any liquid ether which forms by adding to said solution a lower ketone;
   diluting said resulting solution with a lower alcohol to effect crystallization of said ether; and
   recovering said crystallized ether.
3. The method of claim 2 wherein said first organic solvent is a lower alcohol.
4. The method of claim 2 wherein said alcohol is methanol.
5. The method of claim 4 wherein said lower aliphatic ketone is acetone.
6. The method of claim 5 wherein said lower alcohol employed to effect crystallization is methanol.
7. The method of claim 2 wherein said first solvent is a mixture of a lower alcohol and a lower aliphatic ketone.
8. The method of claim 7 wherein said lower alcohol is methanol and said lower aliphatic ketone is acetone.
9. The method for purifying a concentrate of 2,2-bis-(2,3-epoxypropoxyphenyl) propane which comprises dissolving the liquid reaction product of epichlorohydrin with 2,2-bis(4-hydroxyphenyl) propane, in a solvent consisting of a mixture of methanol and a lower aliphatic ketone, cooling the resulting solution to at least about 5° C. and recovering the crystallized ether.

References Cited in the file of this patent
UNITED STATES PATENTS

| | | |
|---|---|---|
| 2,467,171 | Werner et al. | Apr. 12, 1949 |
| 2,506,486 | Bender et al. | May 2, 1950 |
| 2,682,547 | Clemens et al. | June 29, 1954 |
| 2,765,322 | Beavers | Oct. 2, 1956 |

OTHER REFERENCES

Weissberger: Technique of Organic Chem., vol. III, (1950), pages 363–485 (see pages 366, 389, 394–8, 402–14, 471–82).